United States Patent [19]

Pastva

[11] Patent Number: 4,844,524
[45] Date of Patent: Jul. 4, 1989

[54] CURTAINSIDE TRUCK TRAILER CLOSURE ASSEMBLY

[75] Inventor: John V. Pastva, Parma Heights, Ohio

[73] Assignee: The Eastern Company, Cleveland, Ohio

[21] Appl. No.: 106,730

[22] Filed: Oct. 8, 1987

[51] Int. Cl.$^4$ ............................................. E05C 3/02
[52] U.S. Cl. ................................ 292/218; 292/240; 292/DIG. 32; 296/155; 296/181
[58] Field of Search ............... 296/181, 182, 183, 155; 292/213, 217, 218, 240, 241, DIG. 32; 160/328, 329

[56] References Cited

U.S. PATENT DOCUMENTS

| | | | |
|---|---|---|---|
| 3,099,473 | 7/1963 | Pastva, Jr. | 292/218 X |
| 3,212,805 | 10/1965 | Olander | 292/218 |
| 3,464,729 | 9/1969 | Chambers | 292/218 |
| 3,709,552 | 1/1973 | Broadbent | 296/181 |
| 4,087,122 | 5/1978 | Shaw et al. | 292/DIG. 32 |
| 4,134,281 | 1/1979 | Pelcin | 292/218 X |
| 4,458,940 | 7/1984 | Hildebrand | 296/183 |
| 4,545,611 | 10/1985 | Broadbent | 296/155 X |
| 4,700,985 | 10/1987 | Whitehead | 296/181 |

FOREIGN PATENT DOCUMENTS

| | | | |
|---|---|---|---|
| 51931 | 5/1982 | European Pat. Off. | |
| 152195 | 8/1985 | European Pat. Off. | |
| 2847744 | 4/1980 | Fed. Rep. of Germany | |
| 1271211 | 4/1972 | United Kingdom | 292/218 |
| 2071582 | 9/1981 | United Kingdom | |
| 2151293 | 7/1985 | United Kingdom | 292/218 |

OTHER PUBLICATIONS

"New Captive Curtainside Trailer", pp. 44–48 of Trailer/Body Builders; Sep. 1986.
Boalloy Limited—"Tautliner, Insuliner and Localiner", Utility Trailer Manufacturing Company.
Allvan Corporation—"Tautliner", Peerless Division of Lear–Siegler–Trailer/Body Builders Sep. 29, 1986, pp. 41–42; and Transport Topics, Sep. 29, 1986, p. 21.
Peerless Division of Lear–Siegler, Trailer/Body Builders, Sep., 1986, pp. 44–47.
Fruehauf Corporation, Trailer/Body Builders, Feb., 1987, pp. 48–49.

Primary Examiner—James B. Marbert
Assistant Examiner—Russell D. Stormer
Attorney, Agent, or Firm—Watts, Hoffmann, Fisher & Heinke

[57] ABSTRACT

A closure control assembly for tensioning a flexible curtain over an opening in a truck trailer including a shaft with a vertical axis of rotation, bearing members rotatably connecting the shaft to the truck trailer, a driver connected to the shaft and a driven member connected to the curtain for engagement with the driver. The driver includes stepped projections for engagement with stepped surfaces on the driven member for sequential engagement of the driver and driven member upon rotation of the shaft by an operating member. A locking mechanism secured to the curtain engages the operating member to secure the curtain in the tensioned position.

12 Claims, 3 Drawing Sheets

4,844,524

CURTAINSIDE TRUCK TRAILER CLOSURE ASSEMBLY

TECHNICAL FIELD

This invention relates to a closure assembly for a truck trailer or cargo container of the type having a flexible curtain for accessing the interior of a trailer or container along the side to load and unload the truck trailer along its length.

BACKGROUND ART

Trucks, truck trailers and large shipping or cargo containers are generally of the type having a rectangular configuration with two parallel longitudinal side walls and two parallel end walls. One of the end walls typically includes pivoted double doors to facilitate loading and unloading of the truck trailer compartment. While this type of door is capable of facilitating loading operations, the opening it provides is limited in size to the dimensions of the end wall, and thus is inconvenient for loading certain types of cargo.

Special cargo, or special delivery cargo, also requires a greater degree of access to the interior than can be provided by pivoted double doors located on the smaller end wall of the truck trailer. Large heavy cargo, for example, may be difficult and time consuming to load into the truck trailer via the end wall opening. Where delivery of the cargo is required to be made directly to a construction site or other location where the cargo will be used directly, loading equipment and/or personnel may be sufficiently limited as to make the unloading operation quite difficult.

In the past, systems which have been used to provide interior container access via the longitudinal side walls instead of the one end wall, have made use of pivoted single and double doors, as well as doors comprising a flexible curtain. Curtain doors or "curtainside" access systems have consisted of longitudinally as well as vertically moving curtains. One example of a horizontally movable curtain system is shown in U.S. patent application Ser. No. 053,278, filed May 21, 1987.

While these types of curtainside systems have had the advantage of providing extensive load access to the truck trailer interior, one disadvantage has been inadequate hardware for tensioning the curtains and inadequate security techniques for securing the hardware once the curtain is in a closed and tensioned position.

DISCLOSURE OF THE INVENTION

The present invention provides a new and improved closure assembly for tensioning and securing a flexible panel over a longitudinal opening in a rectangular truck trailer or cargo container frame. The term "truck trailer" as used hereinafter is intended to include trucks and cargo containers.

According to the invention, the system includes a flexible panel or curtain which is movably mounted along the truck trailer frame between upper and lower longitudinal edge portions. The flexible panel or curtain forms a wall of the truck trailer and is supported on the rectangular frame over the opening. One or multiple curtains and associated closure assemblies may be positioned along the frame to allow or prevent interior access through the side wall of the truck trailer.

The closure assembly provided serves to secure and tension the flexible curtain in the closed, i.e., expanded, position, and includes a shaft rotatably supported on the truck trailer, a novel driver and driven member adapted to interengage and move the curtain to a tensioned position, and a lock mechanism to secure the closure assembly in a closed position and the curtain in the tensioned position. The driver is connected to the shaft, the driven member is connected to the curtain and an operating mechanism is connected to the shaft for rotating the shaft and sequentially engaging or disengaging the driver and driven member to move the curtain to a tensioned position or to release the curtain for access to the truck trailer interior.

In a preferred embodiment, support posts are mounted between longitudinal edges of the truck trailer frame to support the shaft. One or more drivers are attached to the shaft, and associated driven members are attached to the curtain or to structure secured to the curtain. Where a single flexible panel or curtain is used to cover the opening, the bearing members and shaft may be supported on the truck trailer frame at either end of the longitudinal truck trailer wall, or on a support post or panel mounted adjacent the end of the truck trailer wall. The single curtain may thus be secured in the tensioned position either to the support post or to the frame itself. Where multiple curtains are used, support posts having bearing members and shafts supported thereon may be positioned along the truck trailer intermediate the ends of the truck trailer. As used herein, the term "curtain" is intended to include a flexible curtain panel and any non-flexible curtain structure attached thereto.

The closure assembly is preferably constructed for reversible operation in either a right-hand or left-hand fashion. Thus, the curtain may extend from either end of the truck trailer or be secured in the horizontally tensioned position at either of its ends. The curtain supporting the driven members is preferably configured to include a handle for easily grasping and moving the curtain.

During a normal curtain closing procedure, the curtain is moved from the contracted position, which allows access to the truck trailer interior, to an expanded or closed position in which the curtain covers the opening in the truck trailer. The curtain is moved between positions by an operator grasping the curtain handle and moving the curtain to a substantially closed position. The shaft is supported on bearing members spaced from the support post to allow the driven members to be positioned between the post and the shaft. Once the driven members are positioned between the post and the shaft for engagement with the drivers, the shaft is rotated by movement of the operating member from a position away from the curtain to a position adjacent the curtain. Rotation of the shaft sequentially engages stepped projections of the drivers with stepped surfaces of the driven members, and moves the curtain from the expanded position to the tensioned position. When the operating member is moved to a position substantially parallel with the curtain, and the drivers and driven members are engaged to their fullest extent, the operating member is engaged with a locking mechanism on the curtain structure to secure the closure assembly. A cable seal or padlock shackle may then be engaged with the lock mechanism to prevent rotation of the shaft.

In order to access the interior of the truck trailer, the padlock shackle is first removed from the lock mechanism and the operating member disengaged from the locking mechanism. The curtain may then be moved to the released position by rotating the shaft and sequentially disengaging the drivers and driven members. Once the driver and driven members are disengaged the curtain may be moved from the released and expanded position to the desired contracted position using the curtain handle.

These and other features and advantages of the invention will be better understood from the following description of the invention shown in the accompanying drawings.

BEST MODE FOR CARRYING OUT THE INVENTION

Figure 1:
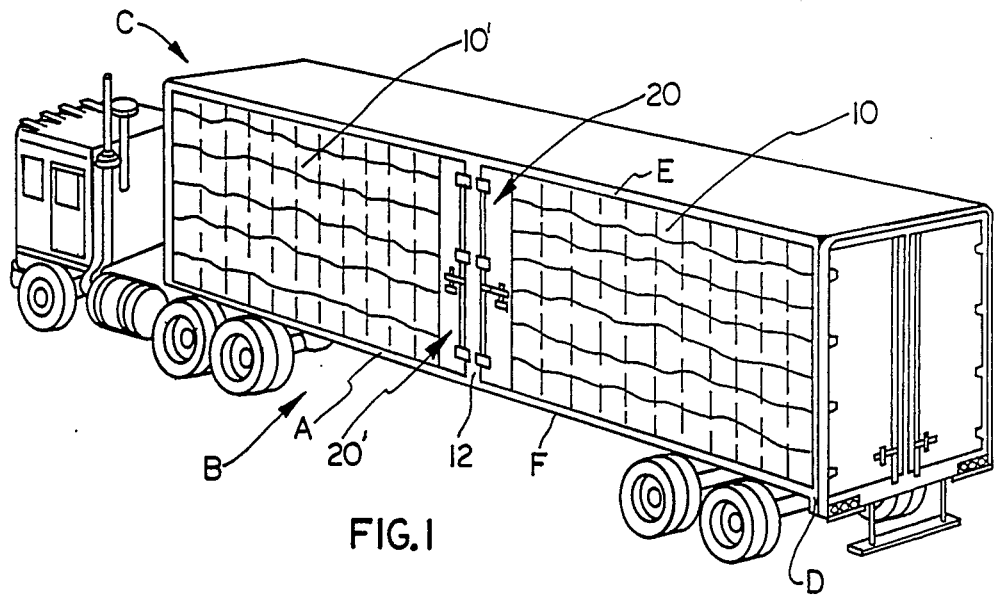
FIG. 1 is a perspective view of a truck trailer showing one embodiment of the closure assembly of the present invention.

A preferred embodiment of the closure assembly of the present invention is illustrated on a truck trailer in FIG. 1. The truck trailer shown includes multiple flexible panels or curtains 10, 10' covering an opening A in a longitudinal side B of the trailer or cargo container C. The curtains 10, 10' are supported on a frame D of the trailer C along upper and lower longitudinal edges E, F of the side B.

A detailed description of the curtain and methods used to support the curtain on the frame is provided in U.S. patent application Ser. No. 053,278, filed May 21, 1987, the disclosure of which is incorporated herein by reference.

The closure assembly generally designated by reference numerals 20, 20' as shown in FIG. 1, is secured in part to a support post 12, and in part to the curtains 10, 10'. The support post 12 is fixed between longitudinal edges E, F of the frame D. The closure assembly 20, 20' is reversible for either right or left handed operation. As illustrated, the curtains 10, 10' are secured at one end to the truck trailer frame D, and at opposite ends to the support post 12 by associated closure assemblies 20, 20'. The right hand closure assembly 20, is secured in part to the curtain 10, and in part to the post 12. The truck trailer C could also be arranged to include additional curtains and fixed support posts, a single curtain, or any combination of curtains, posts and closure assemblies, since the elements are adapted to allow both right and left hand attachments and constructions. Only the right hand configuration 20 of the closure assembly of the present invention will be described in detail.

Figure 2:
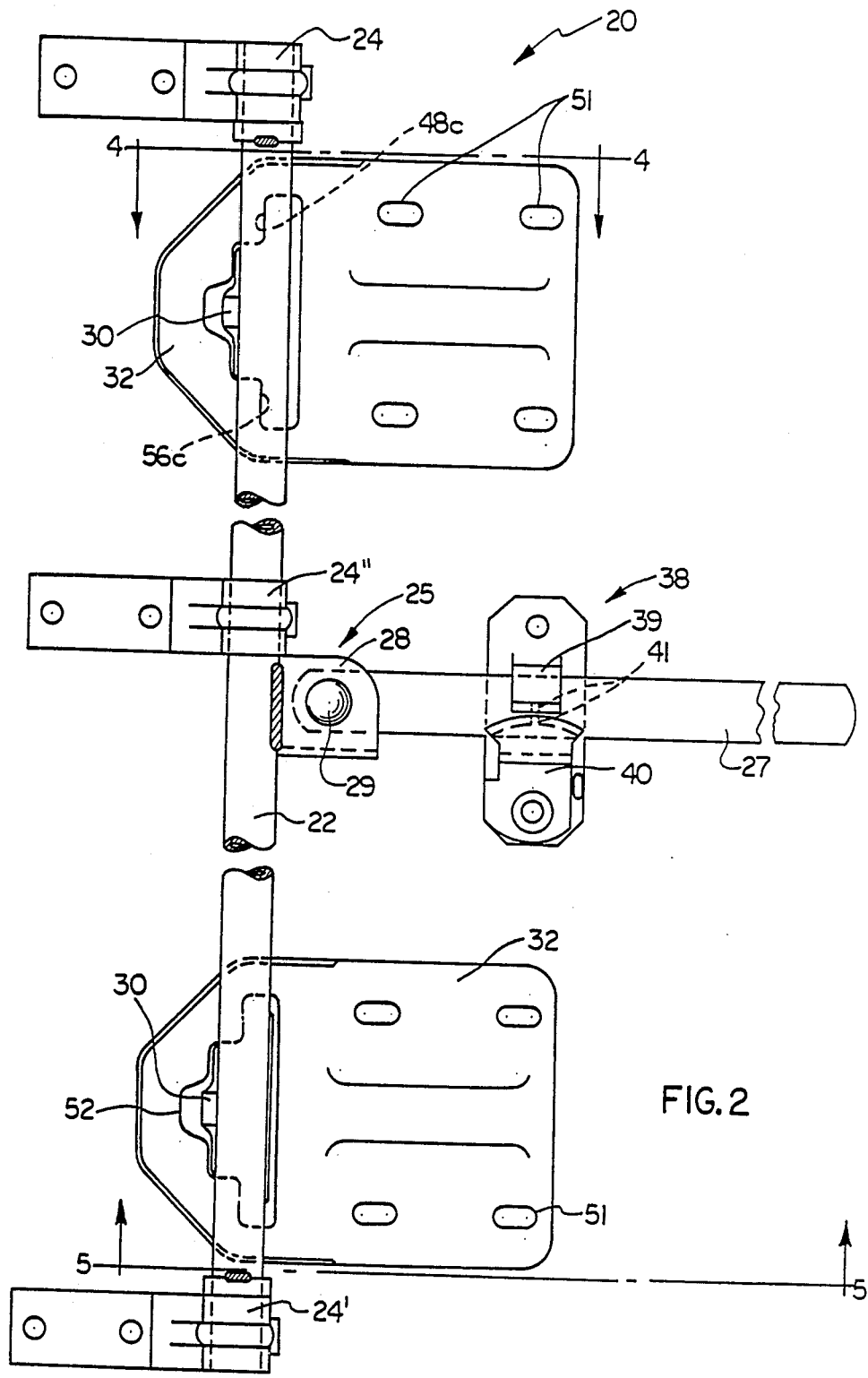
FIG. 2 is a front elevation showing the closure assembly of the present invention with portions broken away.

As illustrated in FIG. 2, the closure assembly includes a shaft 22 rotatable about a vertical axis parallel with the adjacent support post 12 and connected to the support post 12 by bearing members 24, an operating member 25 for rotating the shaft, and associated drivers 30 and driven members 32 for moving the curtain to the tensioned position upon rotation of the shaft. As shown in the multiple curtain embodiment of FIG. 1 the closure assembly 20 is constructed to apply tension to the curtain 10 in a horizontal direction and to secure the curtain in a position closing one portion of the opening A in the side B of the truck trailer C.

Figure 6:
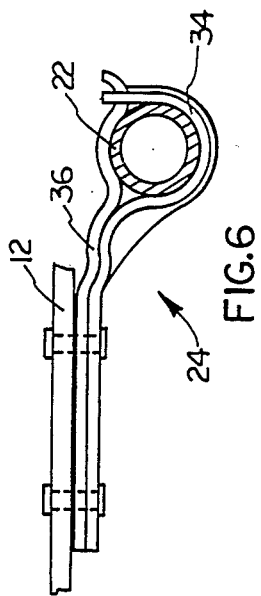
FIG. 6 is a top view of the bearing member of the present invention mounted on the support post and supporting the shaft.

The shaft 22 of the closure assembly is rotatably supported against axial movement by a plurality of upper and lower bearing members 24, 24' secured to the support post 12. The bearing members 24, 24' as illustrated in FIG. 6, include a shaft engagement member 34 and a mounting member 36. The shaft 22 is rotatably secured between the shaft engagement member 34 and the mounting member 36, with the mounting member secured intermediate the shaft engagement member and the support post 12. Each bearing member is configured to support the shaft 22 spaced from the support post. An intermediate bearing member 24" is provided between the two ends of the shaft 22 as shown in FIG. 2.

Figure 5:
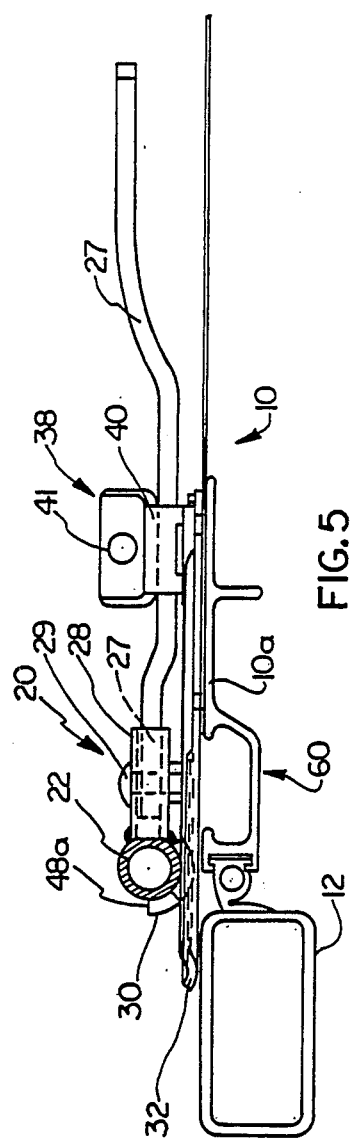
FIG. 5 is a sectional view taken along the line 5—5 in FIG. 2 which additionally shows elements of the assembly engaging the curtain and support post.

The shaft is rotated using the operating member 26 attached to the shaft 22 at a location convenient to facilitate rotation by an operator. As shown in FIGS. 2 and 5, the operating member for rotating the shaft includes an elongate handle portion 27 which is interconnected with the shaft 22 at one end by a U-shaped bracket member 28. As seen in FIG. 5, the handle portion is received within the U-shaped bracket which is welded to the shaft 22. The U-shaped configuration of the bracket allows limited movement of the handle portion about a pivot 29. A conventional fastener 29 interconnects the handle portion 27 and bracket 28.

A lock mechanism 38 is attached to the curtain 10 to secure the handle portion 27 in a fixed position relative to the curtain. The mechanism 38 includes a member 39 fixed to the curtain to receive the handle portion 27 against pivoting movement and to restrain handle movement away from the curtain. A movable member 40 pivotally mounted to the curtain opposite the fixed member is also included for prohibiting movement of the handle portion. The member is rotatable between a capturing position holding the handle and a clearance position that allows the handle portion 27 to be pivoted sufficiently to clear the fixed member and disengage the lock mechanism. Apertures 41 are provided in the fixed and movable members for receiving a conventional padlock shackle or cable seal and retaining the handle portion 27 in the capturing position.

Figure 3:
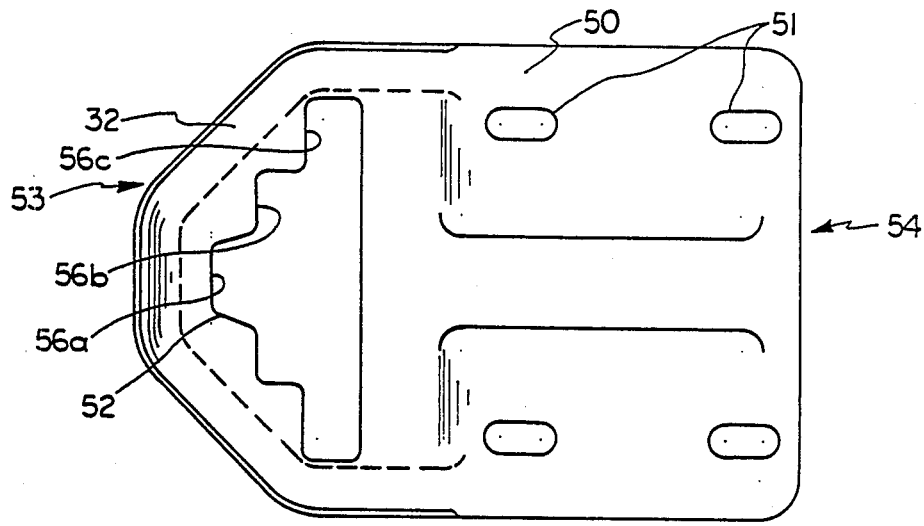
FIG. 3 is a front view of the driven member of the present invention.
Figure 4:
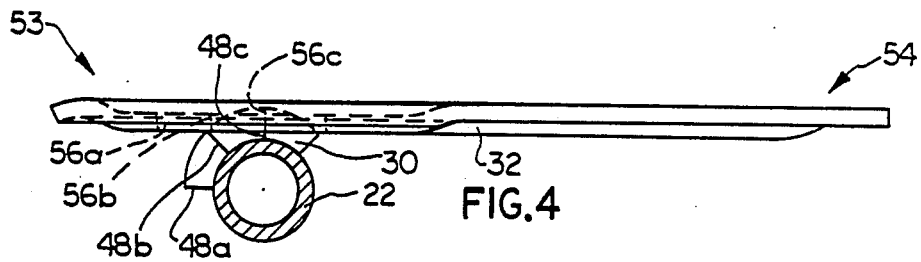
FIG. 4 is a sectional view taken along the line 4—4 in FIG. 2.
Figure 7:
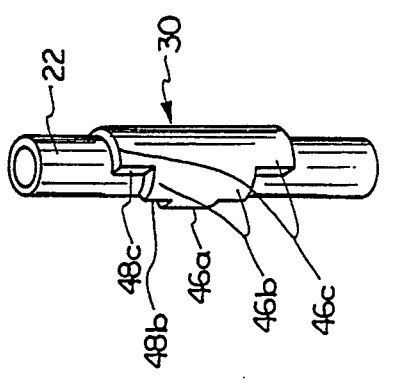
FIG. 7 is a perspective view of a driver of the present invention.

As shown in FIGS. 2, 3 and 4, the closure assembly 20 includes drivers 30 and driven members 32. The drivers, further illustrated in FIGS. 5 and 7, have a partially cylindrical configuration and partially encircle and are welded to the shaft. Each driver includes a continuous concave inner surface 42 which engages the shaft 22, a continuous convex outer surface 44 and stepped projections 46a, 46b, 46c, extending axially and circumferentially. Each projection 46a, 46b, 46c, includes a driving surface 48a, 48b, 48c, for engaging the driven member 32. The driving surfaces 48a, 48b, 48c, are positioned intermediate and transverse to the inner and outer driver surfaces 42, 44, and substantially parallel to the shaft axis of rotation.

As shown in FIGS. 3 and 5, each driven member 32 includes a base plate 50 having an engagement end 53 and an attachment end 54. The base plate 50 is attached along the attachment end 54 to curtain structure 10a integral with one edge of the curtain 10 through apertures 51. An aperture 52 with a stepped periphery is located in the engagement end 53, configured for complemental engagement with the driver 30, and includes surfaces 56a, 56b, 56c which are substantially parallel to the shaft for engagement by the driving surfaces 48a, 48b, 48c.

When the curtain 10 is in an open position such that the opening A in the truck trailer is available for loading and unloading cargo, the curtain is in a contracted or accordion-like position at one end of the opening. When closing the curtain 10, the curtain is moved between the longitudinal edges E, F of the truck trailer frame to an expanded position covering the opening A of the truck trailer. The curtain 10 is moved along the truck trailer by an operator grasping a curtain handle 60 secured within the curtain structure 10a as shown in FIG. 5. The curtain 10 is moved along the side B of the truck trailer until the driven members 32 are under the shaft, and the drivers 30 and driven members 32 are positioned for engagement. Once the curtain is in the expanded position, rotation of the shaft 22 using the operating member 26 engages the drivers with the driven members. When moving the operating member 26 the operator grasps the handle portion 27 and rotates it from a position away from the curtain to a position adjacent the curtain. Movement of the operating member between those positions rotates the shaft 22 and interconnected drivers 30, and results in sequential engagement of the stepped projections 46a, 46b, 46c of the drivers with the aperture 52 of the driven members and drives the attached curtain 10 from the expanded position to the tensioned position. As the shaft is rotated the drivers and driven members are first engaged on the driving and engagement surfaces 48a, 5a. As shaft rotation continues successive driving and engagement surfaces 48b, 56b are engaged until the last driving and engagement surfaces 48c, 56c are engaged. Rotation of the shaft 22 thus tensions the curtain 10. Once the operating member is positioned toward the curtain and the curtain is tensioned, the operating member is positioned for engagement with the lock mechanism 38.

To lock the operating member 26 and thereby prevent rotation of the shaft and disengagement of the drivers and driven members, the movable member 40 is rotated to the clearance position and the handle portion 27 is then moved about its pivot 25 and placed in engagement with the fixed member 39. Once the handle portion 27 is engaged with the fixed member 39, the movable member 40 is rotated to the capturing position and a padlock shackle, cable seal or the like may be engaged through the apertures 41 to prevent removal of the handle and rotation of the shaft.

To release the curtain 10 from the tensioned position, the padlock shackle is removed from the lock mechanism 38 and the movable member is rotated to allow clearance of the handle 27 from the lock mechanism 38. The operating member is then rotated to a position away from the curtain to rotate the shaft and disengage the drivers from the driven members, and the procedures previously described are performed in a reverse sequence. Once released, the curtain may be moved from the expanded position to the contracted position by grasping the curtain handle 60 and moving the curtain to the desired position.

From the above it will be apparent that a novel and improved closure assembly has been provided. While preferred embodiments of this invention have been described in detail, it will be apparent that certain modifications or alterations can be made therein without departing from the spirit or scope of the invention set forth in the appended claims.

I claim:

1. In a cargo carrying structure having a rectangular frame surrounding a longitudinal opening, a flexible curtain movable on said frame generally between upper and lower longitudinal edges of the frame, a closure assembly for tensioning the curtain in a horizontal direction over the opening, said closure assembly including driving means for securing and tensioning the curtain, including a shaft having a vertical axis of rotation, bearing members along said shaft adapted to rotatably connect said shaft to the structure, a rotary driving member supported on said shaft, a driven member supported on said curtain and engageable by the driving member, and an operating mechanism connected to said shaft for oscillating the shaft about its longitudinal axis and driving the curtain between a released position and a tensioned position.

2. A closure assembly used to secure a flexible curtain over an opening in a truck trailer or the like;
   said assembly comprising means for driving the curtain between a released position and a tensioned position, said driving means including a shaft rotatable about a longitudinal axis, bearing members adapted to rotatably connect said shaft to the truck trailer, a driver connected to the shaft, a driven member connected to the flexible curtain at a position for engagement with said driver, and an operating member connected to the shaft for rotating the shaft about its longitudinal axis to engage the driver and driven member and drive the curtain to the tensioned position.

3. A closure assembly to tension a flexible curtain over an access opening in a truck trailer or the like, said assembly comprising a shaft having a longitudinal axis of rotation, bearing members adapted to rotatably connect the shaft to the truck trailer, means for rotating the shaft about its longitudinal axis, and driving said curtain between a released position and a tensioned position including a driver secured to said shaft, a driven member secured to said curtain, said driver and driven member located for complemental sequential engagement, the driver having stepped projections and the driven member having stepped surfaces engageable with the projections, whereby upon rotation of said shaft the stepped projections sequentially engage the driven member to move the driven member relative to said shaft.

4. The closure assembly of claim 3 wherein the driver has a recess for receiving said rotatable shaft and the successive stepped projections are axially displaced each from the next and have driving surfaces which engage said driven member upon rotation of said shaft moving the curtain to a tensioned position.

5. The closure assembly of claim 4 wherein the driven member comprises a base adapted for attachment to said flexible curtain, a stepped cutout for receiving the driver and having engagement surfaces parallel with said shaft to receive said driving surfaces upon rotation of said shaft moving the curtain to the tensioned position.

6. The closure assembly of claim 4 wherein the stepped projections extend circumferentially from the driver to sequentially and symmetrically engage the engagement surfaces of the driven member upon rotation of the shaft.

7. A driver and driven member combination to drive a flexible curtain to a tensioned position and wherein said driver is partially cylindrical, partially encircles a rotatable shaft, and has successive projections, each having a driving surface, axially displaced each from the next, and said driven member has a base adapted for attachment to said flexible curtain and a stepped cutout for receiving said driver and having engagement surfaces parallel with said shaft for receiving said driving surfaces upon rotation of said shaft for moving the curtain to the tensioned position.

8. Apparatus for sequential interengagement for driving a flexible curtain to a tensioned position, said apparatus comprising a rotatable driver curved cylindrically and having a stepped axially extending edge, and a driven member secured to the curtain and having stepped surfaces for complementary interengagement with the stepped edge of the driver upon interengagement of the two and rotation of the driver.

9. In a cargo carrying structure having a rectangular frame surrounding a longitudinal opening, a flexible curtain movable on the frame generally between upper and lower longitudinal edges of the frame, a closure assembly for tensioning the curtain over the opening, said closure assembly comprising a shaft having a longitudinal axis of rotation and bearing members adapted to rotatably connect the shaft to the cargo structure, means for driving the curtain between a released position and a tensioned position including a partially cylindrical driver secured to and partially encircling the shaft and having stepped projections extending axially displaced from one another and each having a driving surface, a driven member having a base secured to the curtain and including a stepped cutout with complemental engagement surfaces for sequentially receiving and engaging the driving surfaces upon rotation of the shaft by an operating member driving the curtain between positions.

10. The cargo carrying structure of claim 9 wherein said closure assembly includes a lock mechanism attached to said curtain and adapted to engage said operating member for securing the curtain in the tensioned position.

11. A method for tensioning a curtain over an opening in a truck trailer comprising the steps of:
moving a driven member secured to the curtain to a position between a rotatable shaft spaced from the truck trailer and the truck trailer;
positioning the driven member under the shaft for interengagement with a rotatable driver secured to and partially encircling the shaft; and
successively engaging stepped surfaces on the driven member with peripherally spaced surfaces on the driver during rotation of the shaft to drive the curtain to a tensioned position.

12. Apparatus for driving a flexible curtain to a tensioned position, said apparatus comprising a driver partially cylindrical in shape and having a central longitudinal axis about which it is rotatable, said driver having one longitudinal side edge with portions displaced from each other in the circumferential and longitudinal directions in a stepped configuration, and a member to be driven rectilinearly by the driver and having an edge surface with coplanar stepped portions displaced from each other in the driven direction and transversely thereof for sequential interengagement with the driver when portions of said edge side are engaged with said edge surface and the driver is rotated, said driver and driven members including means for attachment, one to the flexible curtain and the other to a fixed abutment adjacent thereto.

* * * * *